United States Patent [19]

Fujii et al.

[11] Patent Number: 5,110,870
[45] Date of Patent: May 5, 1992

[54] EXTENSIBLE FILM OR SHEET AND PROCESS FOR PRODUCING THE SAME

[75] Inventors: Toshio Fujii, Kurashiki; Yoshinao Shinohara, Nagareyama; Keishin Handa, Kurashiki, all of Japan

[73] Assignee: Mitsubishi Kasei Corporation, Tokyo, Japan

[21] Appl. No.: 459,328

[22] Filed: Dec. 29, 1989

[30] Foreign Application Priority Data

Jan. 6, 1989 [JP] Japan ............................ 1-999

[51] Int. Cl.$^5$ ................ C08L 23/26; C08L 23/04; C08L 23/16
[52] U.S. Cl. ............................ 525/194; 525/240; 525/333.8
[58] Field of Search .............. 525/240, 194, 333.8

[56] References Cited

U.S. PATENT DOCUMENTS

| | | | |
|---|---|---|---|
| 4,413,097 | 11/1983 | Matsuura et al. | 525/240 |
| 4,429,079 | 1/1984 | Shibata et al. | 525/240 |
| 4,460,750 | 7/1984 | Thiersault et al. | 525/333.8 |
| 4,465,812 | 8/1984 | Moriguchi et al. | 525/333.8 |
| 4,486,579 | 12/1984 | Machon et al. | 526/65 |
| 4,640,856 | 2/1987 | Ferguson et al. | 428/36 |
| 4,801,652 | 1/1989 | Mizutani et al. | 525/240 |
| 4,804,714 | 2/1989 | Olivo | 525/240 |

FOREIGN PATENT DOCUMENTS 58-222131 12/1983 Japan .
58-051121 3/1985 Japan .
60-257232 12/1985 Japan .

OTHER PUBLICATIONS

"VLDPE—A New Class of Polyethylene", 4/86, Plastics & Rubber International, vol. 11, No. 2, pp. 34–36.

Primary Examiner—Carman J. Seccuro
Attorney, Agent, or Firm—Oblon, Spivak, McClelland, Maier & Neustadt

[57] ABSTRACT

This invention provides an extensible film or sheet comprising 100 to 60 parts by weight of an ethylene copolymer having a density of less than 0.910 g/cm$^3$ and 0 to 40 parts by weight of a linear polyethylene having a density of 0.910 to 0.945 g/cm$^3$, specified by the following properties:

1) film blocking as expressed by 180° peel strength is 60 g/25 mm or less;
2) tensile elongation is 750% or more;
3) Elmendorf tear strength is 30 kg.cm/cm$^2$ or more; and
4) 1% secant modulus is 20 to 2,000 kg/cm$^2$.

The film or sheet of this invention has excellent extensibility and is free from blocking. It is also excellent in flexibility and hand and drape and can be preferably used as a film for gather of disposable diapers, etc., packing sheet for disposable diapers, and the like.

10 Claims, No Drawings

EXTENSIBLE FILM OR SHEET AND PROCESS FOR PRODUCING THE SAME

BACKGROUND OF THE INVENTION

The present invention relates to an extensible film or sheet and a process for producing the same. More particularly, the invention relates to an extensible film or sheet having excellent flexibility and extensibility, good hand feeling and fine hand and drape, and suited for use as a diaper gather, diaper back sheet, film used for making foundry molding, pallet stretch film and the like.

Extrusion molded films made from very low-density ethylene copolymers having a density of less than 0.910 g/cm³ tend to suffer from blocking between the films when they are formed according to an ordinary film forming method, due to small crystal portion and a large amount of low-molecular-weight components of the film. The conventional methods of forming said films also had the problem of causing surface roughening of the film because of high viscosity under a low shear rate.

As a solution to this problem, it has been proposed to add an anti-blocking agent such as synthetic silica, a lubricant such as metallic soap or a placticizer in large quantities. These measures, however, were unable to produce a satisfactory effect, and rather there could take place bleeding of the additive to give rise to the problems in drape, hand feeling and sanitation.

Use of additives also had the problem of increased production cost.

Thus, it has been difficult with very-low-density ethylene copolymers to produce the practically usable films because of the defects such as mentioned above, in spite of their excellent extensibility and flexibility in comparison with ordinary polyethylenes.

In view of the above, the present inventors have made further researches on the very-low-density ethylene copolymer films having excellent flexibility and extensibility and, as a result, found that by modifying a material comprising a very-low-density ethylene copolymer or comprising a specific linear polyethylene and a very-low-density ethylene copolymer with a radical forming agent and forming this modified material into a film, it is possible to obtain an extensible film which is excellent in various properties. The present invention was achieved on the basis of this finding.

SUMMARY OF THE INVENTION

In a first aspect of the present invention, there is provided an extensible film or sheet comprising 100 to 60 parts by weight of an ethylene copolymer having a density less than 0.910 g/cm³ and 0 to 40 parts by weight of a linear polyethylene having a density of 0.910 to 0.945 g/cm³, said film or sheet having
(1) a film blocking expressed in terms of 180° peel strength of 60 g/25 mm or less;
(2) a tensile elongation of 750% or above;
(3) an Elmendorf tear strength of 30 kg/cm² or above; and
(4) a 1% secant modulus of 20 to 2,000 kg/cm².

In a second aspect of the present invention, there is provided a process for producing said extensible film or sheet.

DETAILED DESCRIPTION OF THE INVENTION

The very-low-density ethylene copolymer used in the present invention is a copolymer of ethylene and an α-olefin having 3 or more carbon atoms and specified by the fact that it has a melt index of 10 g/10 min or less, preferably in the range of 0.1 to 2 g/10 min, more preferably 0.2 to 1 g/10 min, a density less than 0.910 g/cm³, preferably in the range of 0.85 to 0.90 g/cm³, and a flow ratio of 30 or less, preferably in the range of 5 to 25, more preferably 10 to 25. When the melt index of the ethylene is higher than the upper limit of the above-defined range, the processability becomes too poor, and when the density of the ethylene copolymer exceeds the upper limit of the defined range, the obtained film lacks flexibility and is unsatisfactory in extensibility. Also, when the flow ratio of the ethylene copolymer is higher 30, the properties of the produced film are adversely affected. The ethylene copolymer used in the present invention is preferably the one which, when made into a film, is capable of providing an elongation of 600% or more, preferably 1,000% or more.

In the present invention, the melt index is a value measured according to JIS K-6760 at 190° C., and the elongation is a value determined according to the method for measuring elongation at breakage in the section of Tensile Tests in JIS K-6301. The density is a value measured according to JIS K-6760, and the flow ratio (hereinafter abbreviated as FR) is the ratio of extrusion rate (g/10 min) under shearing force of 10⁶ dyne/cm² (load: 11,131 g) to that under shearing force of 10⁵ dyne/cm² (load: 1,113 g) measured by using the melt indexer used for measuring the melt index.

$$FR = \frac{\text{extrusion rate under load of 11,131 g}}{\text{extrusion rate under load of 1,113 g}}$$

Examples of α-olefins that can be copolymerized with ethylene in the present invention include propylene, butene-1, pentene-1, hexene-1, 4-methylpentene-1 and the like. Among them, propylene and butene-1 are preferred.

The very-low-density ethylene copolymers usable in this invention include terpolymers obtained by copolymerizing ethylene, an α-olefin having 3 or more carbon atoms and a non-conjugated diene. Examples of such non-conjugated dienes are 1,4-hexadiene, dicyclopentadiene, ethylidenenorbornene and the like.

The very-low-density ethylene copolymers can be produced by copolymerizing ethylene, α-olefins, and in some cases, non-conjugated dienes by using a Ziegler-Natta type catalyst, especially one composed of a vanadium compound such as vanadium oxytrichloride, vanadium tetrachloride or the like and an organoaluminum compound.

The ethylene content in the very-low-density ethylene copolymer used in the present invention is preferably in the range of 40 to 90 mol%, and the content of α-olefin having 3 or more carbon atoms is preferably in the range of 10 to 60 mol%.

In the present invention, it is possible to use commercially available very-low-density ethylene copolymers, which include NORSOFLEX (FW 1600, FW 1900, MW 1920, SMW 2440, LW 2220, LW 2500 and LW 2550) available from CdF Chimie E.P., NUC-FLX (DFDA 1137, DEDA 1138, DEFD 1210 and DEFD 9042) available from Nippon Unicar Co., Ltd., TAFMER (A 4085, A 4090, P 0180 and P 0480) available from Mitsui Petrochemical Co., Ltd., and JSR-EP (EP02P, EP07P and EP57P) available from Japan Synthetic Rubber Co., Ltd.

The linear polyethylene to be blended with the very-low-density ethylene copolymer in the present invention is the one having a density in the range of 0.910 to 0.945 g/cm³, preferably 0.915 to 0 940 g/cm³ When the density of the linear polyethylene is less than the above lower limit of 0.910 g/cm³, the produced film becomes susceptible to blocking and surface roughening, and when its density exceeds 0.945 g/cm³, elongation and flexibility of the produced film may become unsatisfactory depending on the blending ratio.

The linear polyethylene used in the present invention is the one having a melt index of 10 g/10 min or less, preferably in the range of 0.2 to 5 g/10 min, and showing, when made into a film, an elongation of 500% or more, preferably 700% or more. When the melt index is greater than 10 g/10 min, film formation becomes very difficult, and when the elongation is less than 500%, the film extensibility becomes unsatisfactory. The flow ratio of the linear polyethylene is preferably in the range of 10 to 70, especially 15 to 35, in view of film strength and transparency.

Usually a linear low-density polyethylene (L-LDPE) is used a the linear polyethylene in the present invention. L-LDPE is a copolymer of ethylene and other α-olefin, which is different from the branched low-density polyethylenes produced by the conventional high-pressure processes.

The linear low-density polyethylene is produced, for example, by copolymerizing ethylene and other α-olefin such as butene, hexene, octene, decene, 4-methylpentene-1 and the like in an amount of about 4 to 17% by weight, preferably about 5 to 15% by weight by using a Ziegler catalyst or Phillips catalyst usually employed for the preparation of medium- and low-pressure high-density polyethylenes. A conventional high-density polyethylene is modified into a short-branched structure by the copolymerization component, and the density is lowered to a proper level, such as about 0.910 to 0.945 g/cm³, by making use of said short-chain branching. Thus, this linear low-density polyethylene is higher in linearity of the polymer chains than the conventional branched low-density polyethylene, and is of a structure having a greater number of branches than the conventional high-density polyethylenes.

The linear polyethylene may be blended in an amount of 0 to 40 parts by weight, preferably 0 to 20 parts by weight, to 100 to 60 parts by weight, preferably 100 to 80 parts by weight of the very-low-density ethylene copolymer. When the blending ratio of the linear polyethylene exceeds 40 parts by weight, the very-low-density ethylene copolymer is suppressed from fully displaying its excellent elongating property and flexibility.

In the present invention, a starting resin composition comprising the very-low-density ethylene copolymer or comprising the very-low-density-ethylene copolymer and the linear polyethylene is modified by a radical forming agent. The radical forming agent used for the modification in this invention is preferably the one whose decomposition temperature at which the half-life period becomes one minute is in the range of 130° to 300° C. Examples of such radical forming agent are dicumyl peroxide, 2,5-dimethyl-2,5-di(t-butylperoxy)-hexane, 2,5-dimethyl-2,5-di(t-butylperoxy)hexyne-3, α,α'-bis(t-butylperoxyisopropyl)benzene, dibenzoyl peroxide, and di-t-butyl peroxide.

The radical forming agent is blended in an amount of 0.001 to 0.1 part by weight, preferably 0.01 to 0.1 part by weight, to 100 parts by weight of the total amount of the very-low-density ethylene copolymer and linear polyethylene. When the amount of radical forming agent blended exceeds 0.1 part by weight, melt index of the starting resin composition becomes excessively low to increase the risk of causing break or cut of the film in the course of film forming and also induce surface roughening of the film.

In the present invention, the technique used for modifying the very-low-density ethylene copolymer or a mixture of the very-low-density ethylene copolymer and the linear polyethylene by blending and decomposing a radical forming agent is not specified. This can be effected, for example, by the following methods.

(1) At the time of blown-film forming, the very-low-density ethylene copolymer, the linear polyethylene, where required, and radical forming agent are fed succesively and melt extruded.

(2) The very-low-density ethylene copolymer, the linear polyethylene, where required, and the radical forming agent are kneaded, reacted and pelletized by using a kneader such as an extruder and a Banbury mixer, and the pellets are converted into film.

(3) A pelletized master batch containing a large amount of radical forming agent is first prepared by blending a large amount (usually about 5,000 to 10,000 ppm) of radical forming agent with the linear polyethylene or the very-low-density ethylene copolymer and melt kneading the mixture at a temperature which is above the melting point of the polyethylene or copolymer and at which the radical forming agent hardly reacts with the polyethylene or copolymer, and this master batch is blended with the very-low-density ethylene copolymer and the linear polyethylene, where required, and converted into film.

The radical forming agent may be added in the form as it is or after dissolving it in a solvent.

Reaction of the very-low-density ethylene copolymer and the linear polyethylene, where required, with the radical forming agent causes molecular coupling of the polymers to give a modified polymer with an increased high-molecular-weight component and a reduced melt index.

The radical forming agent serves principally for performing a crosslinking action on the low-molecular-weight component, which has the effect of improving hand feeling of film surface and preventing blocking of the films.

The crosslinking reaction by use of the radical forming agent is preferably carried out in such a manner that the modified starting resin composition obtained from the reaction (namely, modified product of the very-low-density ethylene copolymer or said copolymer and the linear polyethylene) will have a melt index at 190° C. ($MI_2$) of 5 g/10 min or less, preferably in the range of 0.05 to 2.0 g/10 min and/or a flow ratio ($FR_2$) of 10 or above, preferably 20 or above, while the $MI_2/MI_1$ ratio ($MI_1$ being melt index of the starting resin composition before modification) will be 0.1 to 0.9, preferably in the range of 0.1 to 0.8 from the viewpoint of film-forming properties and extensibility and the $FR_2/FR_1$ ratio ($FR_1$ being flow ratio of the starting resin composition before modification) will be 1.1 or above, preferably in the range of 1.1 to 10 in view of film-forming properties.

The modified starting resin composition, namely the modified product of the very-low-density ethylene copolymer or the copolymer and the linear polyethylene, may be added, if necessary, with known additives such as antioxidant, ultraviolet absorber, antistatic agent, lubricant, etc., which are commonly used in the preparation of polyethylenes.

In the present invention, the modified product of starting resin composition is converted into a film or sheet.

Thickness of the film or sheet is variable depending on the purpose of use, but usually it is in the range of 10 to 3,000 μm.

Conventional film or sheet forming methods can be applied for making the film or sheet of this invention, but it is possible to obtain an especially preferred film by carrying out a blown film forming operation using a ring die with a lip clearance of 0.7 to 4.0 mm under the conditions of extrusion temperature of 150° to 250° C., blow-up ratio of 2 to 6, frost line height of 10 to 100 cm, draft ratio of 3 to 70. The draft ratio referred to herein is a value calculated from the following equation:

$$\text{Draft ratio} = \frac{\rho m}{\rho f} \cdot \frac{G}{t} \cdot \frac{1}{BUR}$$

G: die slit width
t: thickness of the obtained film
ρm: density of resin extruded from the die slit
ρf: density of the obtained film
BUR: blow-up ratio In the case of T-die film forming, it is performed by using a T-die with a lip clearance of 0.5 to 4.0 mm under the conditions of extrusion temperature of 150° to 250° C. and draft ratio of 10 to 40. The T-die draft ratio is calculated from the above-shown equation with BUR supposed to be 1 (BUR=1).

The properties of the film or sheet obtained from the modified starting resin composition are as follows.

(1) Film blocking, as expressed by 180° peel strength, is 60 g/25 mm or less, preferably 30 g/25 mm or less.

According to the following method, 180° peel strength was measured.

A film sample of 25 mm wide (transverse direction)×10 cm long (machine direction) was cut out of a flat tube of a blown film. The two-ply sample film was peeled off from one end by half the original length.

Each of the peeled portions of the sample film was mounted to each of the virtically arranged chucks of a tensile machine with a chuck interval of 50 mm and a sample length of 25 mm.

Then, the lower chuck was moved down at a rate of 300 mm/min while the upper chuck was kept to be stationary, thereby measuring the stress when the two-ply sample film was peeled off at a peel angle of 180°.

When the film blocking (180° peel strength) is higher than 60 g/25 mm, the film may suffer from plastic deformation when the blocked films are separated.

(2) Tensile elongation is 750% or above, preferably 900% or above.

Tensile elongation was determined according to the method of measuring elongation at breakage in the section of Tensile Tests of JIS K-6301. Of the measured values in the transverse direction and machine direction of the sample film, the greater one was shown.

When tensile elongation is less than 750%, there can not be obtained sufficient extensibility.

(3) Elmendorf tear strength is 30 kg.cm/cm$^2$ or above, preferably 50 kg/cm or above.

Elmendorf tear strength was measured according to JIS P-8116. Of the measured values in the transverse direction and machine direction of the film, the greater one was shown.

When Elmendorf tear strength is less than 30 kg/cm, films obtained are easily tore in the use where high extensibility is required.

(4) 1% secant modulus is 20 to 2,000 kg/cm$^2$, preferably 20 to 500 kg/cm$^2$.

1% secant modulus was determined by pulling a 2.5 cm wide and 1,500 mm long strip of sample film at a rate of 10 mm/min and measuring the stress at 1% elongation according to the method of JIS K-6301. The mean value of the stresses in the transverse direction and in the machine direction of the film strip was shown.

When 1% secant modulus is less than 20 kg/cm$^2$, film strength proves to be unsatisfactory in applications where high extensibility is required, and when 1% secant modulus exceeds 2,000 kg/cm$^2$, the obtained film lacks flexibility in uses where high extensibility is needed.

The present invention will be described in further detail below by showing the examples thereof, but it is to be understood that these examples are merely intended to be illustrative and not to be construed as limiting the scope of the invention.

EXAMPLE 1

An organic peroxide 2,5-dimethyl-2,5-di(t-butyl-peroxy)hexyne-3 used as radical forming agent was mixed in an amount of 0.03% by weight with an ethylenepropylene copolymer (MI:2.0 g/10min; density: 0.89 g/cm$^3$; elongation: 1,100%; flow ratio: 23; propylene content: 22% by weight). Blown film was formed from the mixture by using a blown film equipment which comprises DELSER 40 mmφextruder (mfd. by Modern Machinary Inc.) equipped with a circular die with a ring slit diameter of 100 mmφand a lip clearance of 1.2 mm and a cooling air ring, the film blowing being carried out under the conditions of extrusion temperature of 180° C.; through put (extrusion rate) of 10 kg/hr, blow-up ratio (BUR) of 3.0; frost line height of 32 cm; take-up rate of 6.8 m/min., thereby obtaining a 30 μm thick blown film.

The results of determination of various properties of the obtained film are shown in Table 1.

Determination of the properties shown in the table was conducted according to the following methods.

(a) Film surface condition

It was visually observed whether "shark skin" was formed or not.

(b) Film blocking (180° peel strength) of film

A film sample of 25 mm wide (transverse direction)×10 cm long (machine direction) was cut out of a flat tube of a blown film. The two-ply sample film was peeled off from one end by half the original length.

Each of the peeled portions of the sample film was mounted to each of the virtically arranged chucks of a tensile machine with a chuck interval of 50 mm and a sample length of 25 mm.

Then, the lower chuck was moved down at a rate of 300 mm/min while the upper chuck was kept to be stationary, thereby measuring the stress when the two-ply sample film was peeled off at a peel angle of 180°.

(c) Elmendorf tear strength

This was measured according to JIS P-8116. Of the determined values in the transverse direction and in the machine direction (film take-up direction) of the film, the greater one was shown.

(d) Tensile elongation

This was determined according to the method for measuring film elongation at breakage in the section of Tensile Tests of JIS K-6301. Of the measured values of elongation in the transverse direction and in the machine direction of the film, the greater one was shown.

(e) 1% secant modulus

A 2.5 cm wide and 1,500 mm long strip of sample film was pulled at a rate of 10 mm/min and stress at 1% elongation was measured according to JIS K-6301. The mean of the determined values in the transverse direction and in the machine direction of the strip of sample film was shown.

EXAMPLES 2-4 AND COMPARATIVE EXAMPLES 1-4

Film samples were prepared by conducting the same film-forming operations as in Example 1 except for change of the type and amount of the component of the materials as shown in Table 1. The obtained film samples were evaluated in the same way as described above. The evaluation results are shown in Table 2.

TABLE 1

| | | Example 1 | Example 2 | Example 3 | Example 4 | Comparative Example 1 | Comparative Example 2 |
|---|---|---|---|---|---|---|---|
| Ethylene Copolymer | Type | Ethylene-Propylene Copolymer | Ethylene-Propylene Copolymer | Ethylene-Propylene Copolymer | Ethylene-Propylene Copolymer | Ethylene-Propylene Copolymer | Ethylene-Propylene Copolymer |
| | MI(g/10 min) | 2.0 | 0.2 | 0.5 | 0.8 | 2.0 | 2.0 |
| | Density (g/cm$^3$) | 0.89 | 0.905 | 0.87 | 0.86 | 0.89 | 0.89 |
| | FR | 23 | 25 | 17 | 17 | 23 | 23 |
| | Tensile Elontgation (%) | 1100 | 950 | 1400 | 1500 | 1100 | 1100 |
| | Amount used (wt %) | 100 | 100 | 100 | 70 | 50 | 60 |
| Linear Polyethylene | Type | — | — | — | Ethylene-Propylene Copolymer | Ethylene-Propylene Copolymer | High-density Polyethylene |
| | MI(g/10 min) | — | — | — | 1.5 | 4.0 | 2.0 |
| | Density (g/cm$^3$) | — | — | — | 0.92 | 0.93 | 0.965 |
| | FR | — | — | — | 22 | 22 | 33 |
| | Tensile Elontgation (%) | — | — | — | 800 | 600 | 600 |
| | Amount used (wt %) | — | — | — | 30 | 50 | 40 |
| Radical forming agent | Amount added (wt %) | 0.03 | 0.005 | 0.1 | 0.04 | 0.01 | 0.1 |
| Modified Starting Resin Composition | MI$_2$/MI$_1$ | 0.4 | 0.9 | 0.1 | 0.3 | 0.8 | 0.1 |
| | FR$_2$/FR$_1$ | 2.2 | 1.1 | 9.5 | 2.6 | 1.2 | 10.5 |

| | | Comparative Example 3 | Comparative Example 4 |
|---|---|---|---|
| Ethylene Copolymer | Type | Ethylene-Propylene Copolymer | Ethylene-Propylene Copolymer |
| | MI(g/10 min) | 0.2 | 2.0 |
| | Density (g/cm$^3$) | 0.86 | 0.88 |
| | FR | 25 | 23 |
| | Tensile Elontgation (%) | 1500 | 1100 |
| | Amount used (wt %) | 100 | 100 |
| Linear Polyethylene | Type | — | — |
| | MI(g/10 min) | — | — |
| | Density (g/cm$^3$) | — | — |
| | FR | — | — |
| | Tensile Elontgation (%) | — | — |
| | Amount used (wt %) | — | — |
| Radical forming agent | Amount added (wt %) | — | 0.5 |
| Modified Starting Resin Composition | MI$_2$/MI$_1$ | 1 | 0.1 |
| | FR$_2$/FR$_1$ | 1 | 15.7 |

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Processing Method | Film Blowing | Film Blowing | Film Blowing | Film Blowing | Film Blowing | Film Blowing | Film Blowing | Film Blowing |
| Film surface condition | Good | Good | Good | Good | Good | Good | surface roughened | surface roughened |
| Film blocking | 5 | 5 | 30 | 10 | 10 | 3 | Film stretched due to heavy blocking | 20 |

TABLE 2-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Elmendorf tear strength (kg/cm) (g/25 mm) | 70 | 100 | Unmeasurable due to film stretching | 140 | 95 | 175 | and did not separate Unmeasurable due to film stretching | 280 |
| Tensile eleongation (%) | 1200 | 1000 | 1500 | 1200 | 700 | 700 | 1500 | 1300 |
| 1% secant modulus (kg/cm$^2$) | 500 | 1270 | 180 | 200 | 1450 | 2200 | 30 | 200 |

What is claimed is:

1. An extensible film or sheet obtained by converting into a film or sheet a starting resin composition comprising: 100 to 60 parts by weight of an ethylene copolymer having a density of less than 0.910 g/cm$^3$, a flow ratio of 30 or less and a melt index of 10 g/10 min or less; and a positive amount up to 40 parts by weight of a linear polyethylene having a density of 0.910 to 0.945 g/cm$^3$ while reacting or after reacting said starting resin composition with a radical forming agent in an amount of 0.001 to 0.1 part by weight to 100 parts by weight of said starting resin composition, said film or sheet having
   1) a film blocking expressed in terms of 180 ° peel strength of 60 g/25 mm or less;
   2) a tensile elongation of 750% or more;
   3) an Elmendorf tear strength of 30 kg/cm$^2$ or more; and
   4) a 1% secant modulus of 20 to 2,000 kg/cm$^2$.

2. An extensible film or sheet according to claim 1, wherein said ethylene copolymer comprises 40 to 90 mol% of units derived from ethylene and 10 to 60 mol% of units derived from α-olefin having 3 or more carbon atoms.

3. An extensible film or sheet according to claim 2, wherein said α-olefin is at least one member selected from the group consisting of propylene, butene-1, pentene-1, hexene-1 and 4-methylpentene-1.

4. An extensible film or sheet according to claim 1, wherein the melt index of said linear polyethylene is 10g/10 min or less.

5. A process for producing an extensible film or sheet having
   1) a film blocking expressed in terms of 180° peel strength of 60 g/25 mm or less;
   2) a tensile elongation of 750% or more;
   3) an Elmendorf tear strength of 30 kg.cm/cm$^2$ or more; and
   4) a 1% secant modulus of 20 to 2,000 kg/cm$^2$, which comprises: extruding into a film or sheet a staring resin composition comprising 100 to 60 parts by weight of an ethylene copolymer having a density of less than 0.910 g/cm$^3$ a flow ratio of 30 or less and a melt index of 10 g/10 min or less; and a positive amount up to 40 parts by weight of a linear polyethylene having a density of 0.910 to 0.945 g/cm$^3$, while reacting or after reacting said starting resin composition with a radical forming agent in an amount of 0.001 to 0.1 part by weight to 100 parts by weight of said starting resin composition.

6. The process according to claim 5, wherein said ethylene copolymer comprises 40 to 90 mol% of units derived from ethylene and 10 to 60 mol% of units derived from α-olefin having 3 or more carbon atoms.

7. The process according to claim 6, wherein said α-olefin is at least one member selected from the group consisting of propylene, butene-1, pentene-1, hexene-1 and 4-methylpentene-1.

8. The process according to claim 5, wherein the melt index of sad linear polyethylene is 10 g/10 min or less.

9. The process according to claim 5, wherein the melt index (MI$_2$) of the modified resin composition obtainer by reacting said starting resin composition with said radical forming agent is 5 g/10 min or less, and the ratio of MI$_2$ to the melt index (MI$_1$) of the starting resin composition before reaction (MI$_2$/MI$_1$) is 0.1 to 0.9.

10. The process according to claim 5, wherein the flow ratio (FR$_2$) of the modified resin composition obtainer by reacting said starting resin composition with said radical forming agent, which is defined by the following formula:

$$\text{Flow ratio} = \frac{\text{extrusion rate under load of 11.131 g}}{\text{extrusion rate under load of 1.113 g}}$$

is 10 or above, and the ratio of FR$_2$ to the flow ratio (FR$_1$) of the resin composition before reaction (FR$_2$/FR$_1$) is 1.1 or above.

* * * * *